United States Patent
Heim et al.

[19]

[11] Patent Number: 6,086,139

[45] Date of Patent: Jul. 11, 2000

[54] MOTOR VEHICLE DOOR WITH A DETACHABLY MOUNTED OUTSIDE DOOR PANEL

[75] Inventors: Gunther Heim, Waldaschaff; Stephan Schütt, Goldbach; Armin Klein, Westerngrund, all of Germany

[73] Assignee: Wagon Automotive GmbH, Waldaschaff, Germany

[21] Appl. No.: 09/172,161

[22] Filed: Oct. 14, 1998

[30] Foreign Application Priority Data

Oct. 14, 1997 [DE] Germany .............. 197 46 724

[51] Int. Cl.⁷ .................. B62D 25/04; B60J 5/04
[52] U.S. Cl. .................. 296/146.5; 296/191
[58] Field of Search .............. 296/146.1, 146.5, 296/146.9, 191, 196, 197, 146.7; 49/502

[56] References Cited

U.S. PATENT DOCUMENTS

| | | | |
|---|---|---|---|
| 2,566,871 | 9/1951 | Bedford et al. | 49/502 |
| 4,843,762 | 7/1989 | Grier et al. | 296/146 |
| 5,040,334 | 8/1991 | Dossin et al. | 296/146 |
| 5,050,351 | 9/1991 | Goldbach et al. | 296/146 |
| 5,345,721 | 9/1994 | Stein et al. | 296/146.7 |
| 5,647,631 | 7/1997 | Lee | 296/146.5 |

FOREIGN PATENT DOCUMENTS

| | | |
|---|---|---|
| 690 00 874 | 6/1993 | Germany . |
| 195 14 963 | 10/1996 | Germany . |
| 195 14 964 | 10/1996 | Germany . |
| 196 39 280 | 3/1998 | Germany . |
| 405278468 | 10/1993 | Japan .................. 296/146.5 |

*Primary Examiner*—D. Glenn Dayoan
*Assistant Examiner*—Greg Blankenship
*Attorney, Agent, or Firm*—Nixon Peabody LLP; David S. Safran

[57] ABSTRACT

A motor vehicle door with a door frame (1) and with an outside door panel (2) which can be attached to the door frame (1). The door frame (1) has an undercut guide groove (10) on a first edge and on a second edge which is roughly opposite the first edge. The outside door panel (2), on its first and second edge, has undercut guide rails (12) which fit into the guide grooves (10). The door frame (1) on a third edge which runs roughly transversely to the first and second edge has a retaining groove and on the fourth edge roughly opposite the third edge has a catch groove. The outside door panel (2) on the third edge has a retaining rail which fits into the retaining groove and on the fourth edge has a catch rail which fits into the catch groove. The outside door panel (2) with the guide rails (12) can be pushed into the guide grooves (10) on the door frame (1) in the longitudinal direction until the retaining rail has entered the retaining groove and the catch rail has engaged the catch groove.

14 Claims, 8 Drawing Sheets

MOTOR VEHICLE DOOR WITH A DETACHABLY MOUNTED OUTSIDE DOOR PANEL

BACKGROUND OF THE INVENTION

1. Field of the Invention

The invention relates to motor vehicle doors such as conventional motor vehicle side doors, sliding doors, rear doors which can move to the top or side, and rear hatches, etc. More specifically, the invention relates to such doors having a door frame and an outside door panel which can be mounted on the door frame.

2. Description of the Related Art

In the following specification, the term motor vehicle door is used to represent all the various types of doors used on motor vehicles such as side doors, sliding doors, rear doors and rear hatches. In motor vehicle doors, there is generally provided a door frame which is made as torsionally rigid as possible. The door frame is usually made of a metal or metal sections which may, in the prefered embodiment, be made from aluminum sections. The paneling of the door frame is accomplished by attaching an outside door panel to the door frame. The outside door panel generally made from a thin metal sheet or a molded plastic. The motor vehicle doors also include a corresponding inside door panel in addition to an inside door covering or alternatively, an integrated inside door panel/inside door covering.

An important objective in designing and constructing a motor vehicle door is to provide a simple structure in the area of the motor vehicle door that will allow prompt and simple repair of any door component. Examples of this can be found in the published German patent applications DE 195 14 963 A1 and DE 195 14 964 A1.

The DE 195 14 963 A1 application discloses a motor vehicle door including a door frame and an outside door panel which is detachably mounted on the door frame. In this application, the door frame which has a retaining groove on an edge which runs roughly transversely to two other sides of the door includes a transversely running catch groove assigned to an edge of the outside door panel which is the upper edge when the outside door panel is in the installed position. The outside door panel includes a catch rail on a corresponding edge which is assigned to and fits into the catch groove. On the opposite lower edge, the outside door panel has a retaining groove formed by a U-shaped bend. This groove interacts with a retaining rail which is located on the lower edge of the inside door panel which is drawn forward into an area of the outside door panel. For mounting purposes the outside door panel is shifted from the bottom to the top on the door frame such that the retaining rail on the inside door panel fits into the retaining groove on the outside door panel and the catch rail on the outside door panel fits into the catch groove on the door frame.

Therefore, according to this application, the motor vehicle door is comprised of the door frame, outside door panel, and inside door panel. Furthermore, the outside door panel is directly connected to the inside door panel, and consequently, the outside door panel can be mounted only in conjunction with the inside door panel.

When using a non-reinforced plastic with high coefficient of thermal expansion for the outside door panel, the above explained prior art motor vehicle door requires considerable gap dimensions in the door area because the outside door panel lengthens considerably (several millimeters) in the longitudinal direction (in the installed position) when the outside door panel is heated by high ambient temperature conditions. Of course, because the door frame is made of a metal which has a lower coefficient of expansion than the plastic, the door frame does not lengthen to the same extent as the plastic outside door panel.

In the motor vehicle door disclosed in German application DE 690 00 874 T2, the outside door panel is attached to the door frame by first pushing the panel vertically from the bottom to the top relative to the door frame, and then, by pushing the panel into the end position horizontally from the back to the front. When shifted horizontally, forward pointing clamps located on the upper edge and the front edge of the outside door panel are inserted into the corresponding openings on the door frame, thereby hooking in the outside door panel. In addition, this application also discloses grooves formed on the bottom edge and rear edge of the outside door panel which are inserted into the assigned edges of the door frame.

Thus, the above applications disclose various feasible methods for attaching an outside door panel to a door frame. A disadvantage with these methods is that, because of the recesses in the door frame, metal-cutting or similar metal processing on the door frame is necessary. Furthermore, these prior art designs do not effectively address the problem of high thermal elongation of the outside door panel when these panels are heated. As a result, the gap dimensions required to allow this expansion remains large and unchanged from other designs known in the art.

SUMMARY OF THE INVENTION

One object of the present invention is to devise and develop a motor vehicle door including a door frame and an outside door panel such that gap dimensions between the panel and the adjacent vehicle body components are minimized.

Another object of the present invention is to provide a motor vehicle door which can be expediently repaired and mounted.

The aforementioned task is achieved by a motor vehicle door with the features of described herein.

By using undercut guide grooves and guide rails on two opposite edges for attaching the outside door panel to the door frame, the outside door panel is fixed on the door frame at these sites. It can also be only slightly shifted relative to the door frame when an increase in the ambient temperature leads to an increase in the length of the outside door panel. The change in the length of the outside door panel when the temperature rises due to the high coefficient of thermal expansion, in this construction, is reflected almost exclusively in the change of the arch of the outside door panel. The result is that the car body can be produced with relatively small gap dimensions, even in the door region, because the gap dimensions hardly change when the ambient temperature increases.

Tongue and groove connections selected on the transversely running edges round out the joining technique in the transverse direction. Here, thermal elongation is more acceptable.

The construction of the invention is especially advantageous if, in it, the outside door panel is pushed from bottom to top onto the door frame, if therefore the first edge is the edge which is the front one in the installation position and the second edge is the edge which is the rear one in the installation position on the door frame and accordingly the third edge which runs transversely thereto is the lower edge and the fourth opposite edge is the upper edge on the door frame in the installation position. Here, it is essential that lateral, horizontal displacement not take place at the end of the vertical displacement motion. Due to the undercuts on the guide grooves and guide rails this is precluded.

The older German application of the assignee of the present application which was not published until prior to the effective filing date of this application, No. DE 196 39 280 A1, discloses mounting an outside door panel on a door frame of a motor vehicle door solely by horizontal pushing. The top guide groove which runs in the pushing direction on the door frame is undercut in one embodiment, but the opposite guide groove is not. Consequently this citation does not show the bilateral fixation of the outside door panel on the door frame, said fixation running in the insertion direction and however being decisive for small gap dimensions. In this older application profile seals for "floating" bearing of the guide rails in the guide grooves are made in order to absorb the deformation energy for smaller side loads of the motor vehicle door. These construction details can also be accomplished at the corresponding locations in the motor vehicle door according to the present application.

These and further objects, features and advantages of the present invention will become apparent from the following description when taken in connection with the accompanying drawings which, for purposes of illustration only, shows a single embodiment in accordance with the present invention.

DETAILED DESCRIPTION OF THE INVENTION

The present invention is explained in detail below using a driver side door of a motor vehicle. However, it should be understood that the present invention can be easily practiced in other types of motor vehicle doors such as side doors, sliding doors, rear doors and rear hatches.

Figure 1:
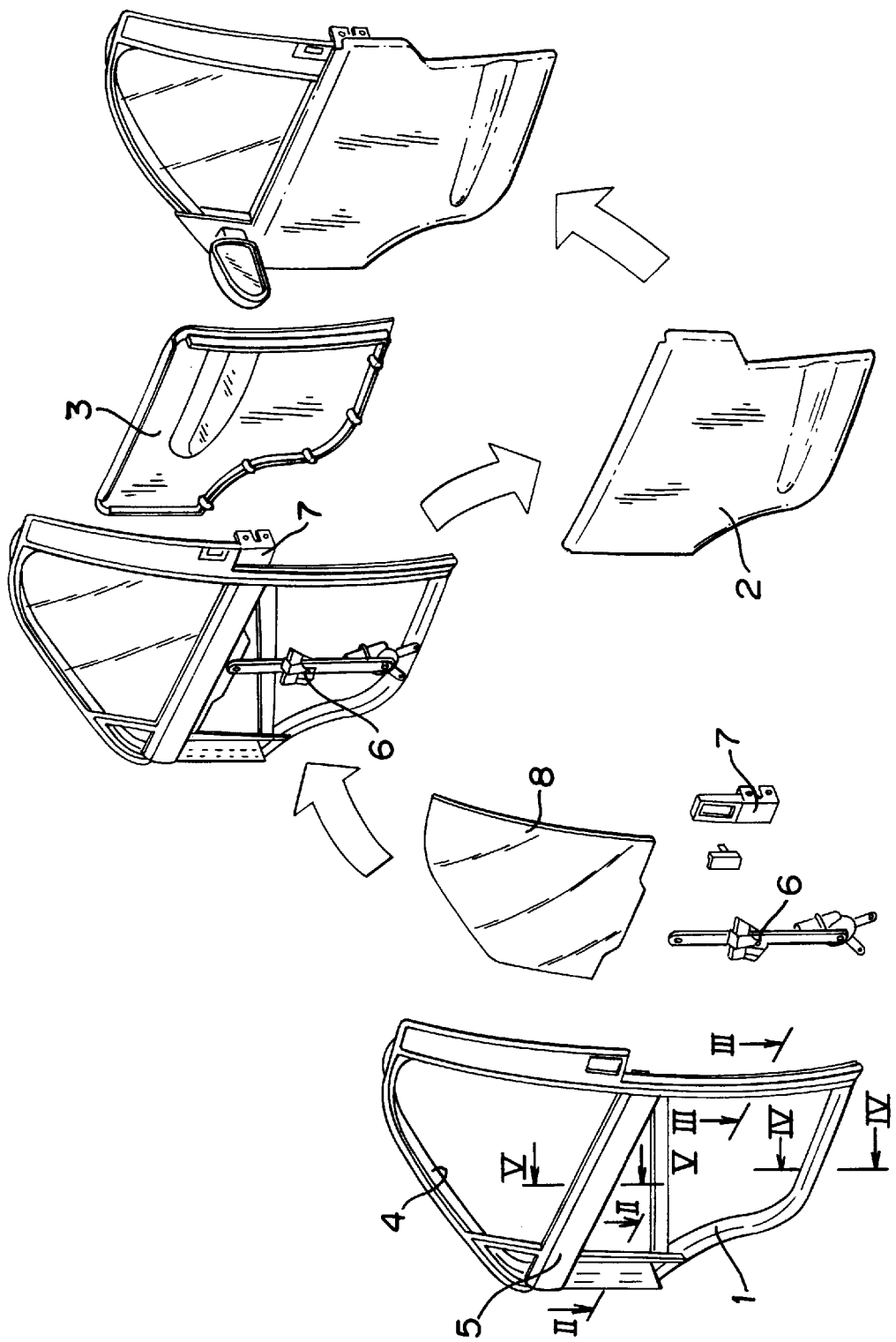
FIG. 1 is an exploded view of one embodiment of a motor vehicle door or the like in which the sequence of assembly is illustrated by arrows.

The preferred embodiment of a motor vehicle door according to the invention is illustrated in FIG. 1, as noted, for the driver side door of the motor vehicle, and clearly shows the door frame 1, which in the preferred embodiment, is made from aluminum, and forms a hinge frame, a lock frame and a bottom frame. An outside door panel 2 is shown which can be attached to the door frame 1 as a panel and may preferably be made from a plastic molding. Furthermore, on the inside of the door, an inside door panel 3 is provided which is also a panel. In the top area of the door frame 1 there is a window frame 4 which is bordered underneath by a transversely running window shaft profile 5 of the door frame 1. These specific features and how window shaft profile 5 is provided inside the door frame 1 are clearly illustrated in FIG. 5. Both the door frame 1 and the window shaft profile 5 act together as a module carrier, especially for attaching a window opener 6 (shown in its middle position), an outside door handle arrangement 7 and an inside door handle arrangement (not shown). The lowerable window pane 8 of this motor vehicle door is also clearly shown.

FIG. 1 shows the assembly sequence of a motor vehicle door in accordance with an embodiment of the present invention and the final paneling of the door frame 1 with the outside door panel 2.

FIGS. 2 to 5 shows various sectional views of the numerous components and their relative positions with respect to the door frame 1. The individual cross sections, however, show the door frame 1 with the outside door panel 2 and the inside door panel 3 in their assembled positions together with frame sections 9 defining the door opening of the body of the motor vehicle into which the corresponding motor vehicle door is fitted. The illustrated seals are each shown in an undeformed position so that they are not tensioned or compressed. Thus, some overlaps occur in the drawing which in reality, are of course not present.

In practicing the present invention, it is important that the door frame 1 be provided guide grooves 10, 11 on the first edge and on the second edge which is opposite the first edge. These guide grooves 10 and 11 can be seen in FIGS. 2 and 3 and it is apparent that these two guide grooves 10, 11 are undercut. In this embodiment, the guide grooves 10, 11 are made asymmetrical but having a generally T-shape. However, the undercut may also be L-shaped, dovetailed, or shaped in some other form.

Figure 2:
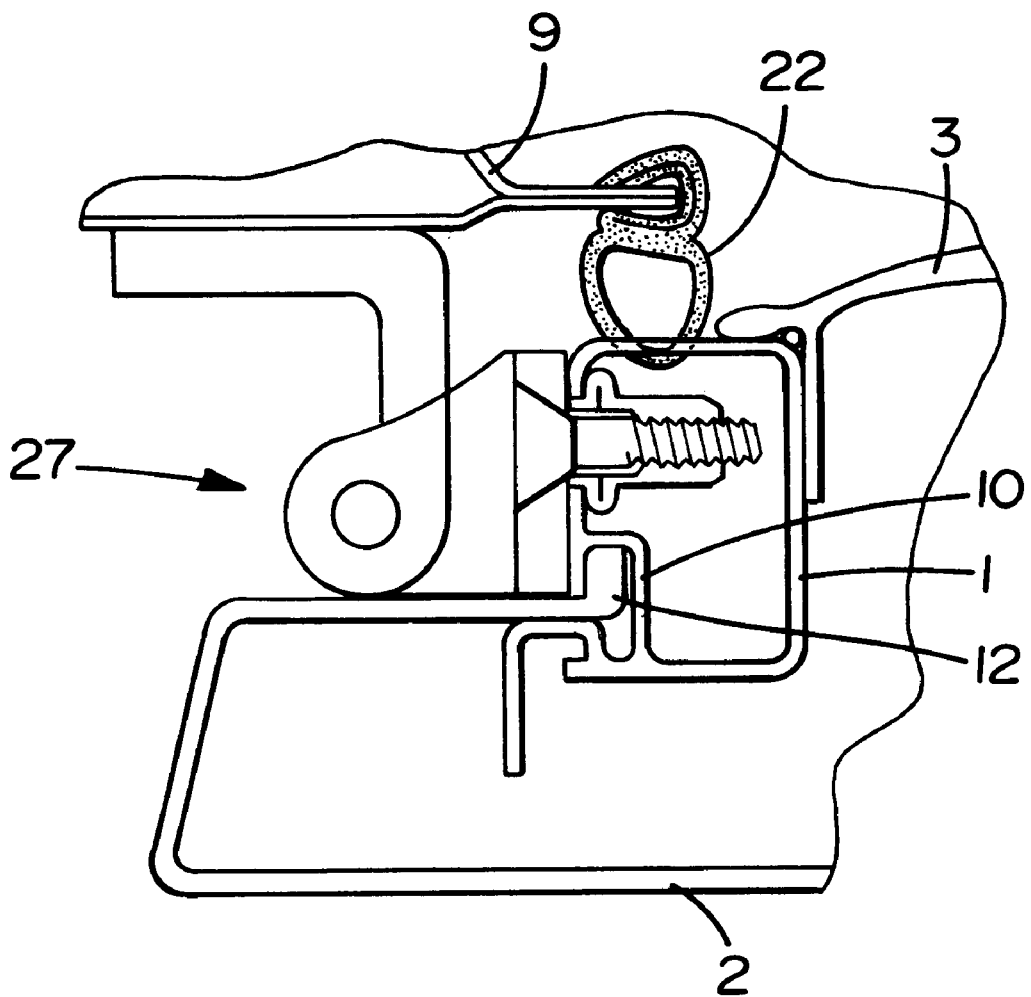
FIGS. 2, 3, 4, and 5 each show a sectional view of a portion of the motor vehicle door in FIG. 1 as taken along lines 2—2, 3—3, 4—4, & 5—5, respectively but with the motor vehicle door completely assembled on the door opening of the car body.
Figure 3:
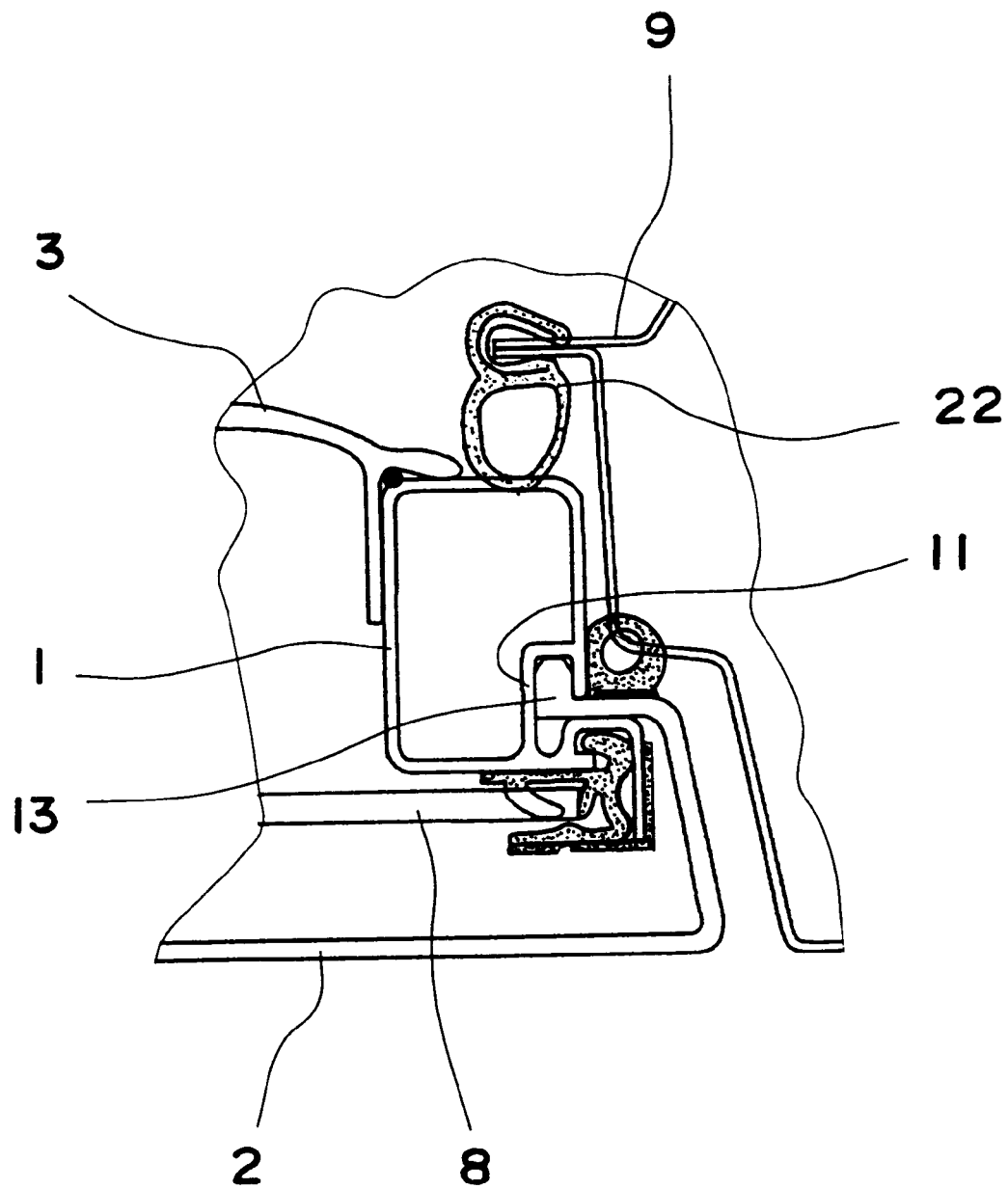

As illustrated in FIGS. 2 and 3, the outside door panel 2 has undercut guide rails 12, 13 which correspond to the guide grooves 10, 11. In this embodiment, the guide rails 12, 13 are made L-shaped and thus, conform with the undercut. It can be seen from an examination of FIGS. 2 and 3 that, in this way, the outside door panel 2 can be shifted relative to door frame 1 in the lengthwise direction of the guide grooves 10, 11, but otherwise cannot be moved in the area of the guide grooves 10, 11.

Figure 4:
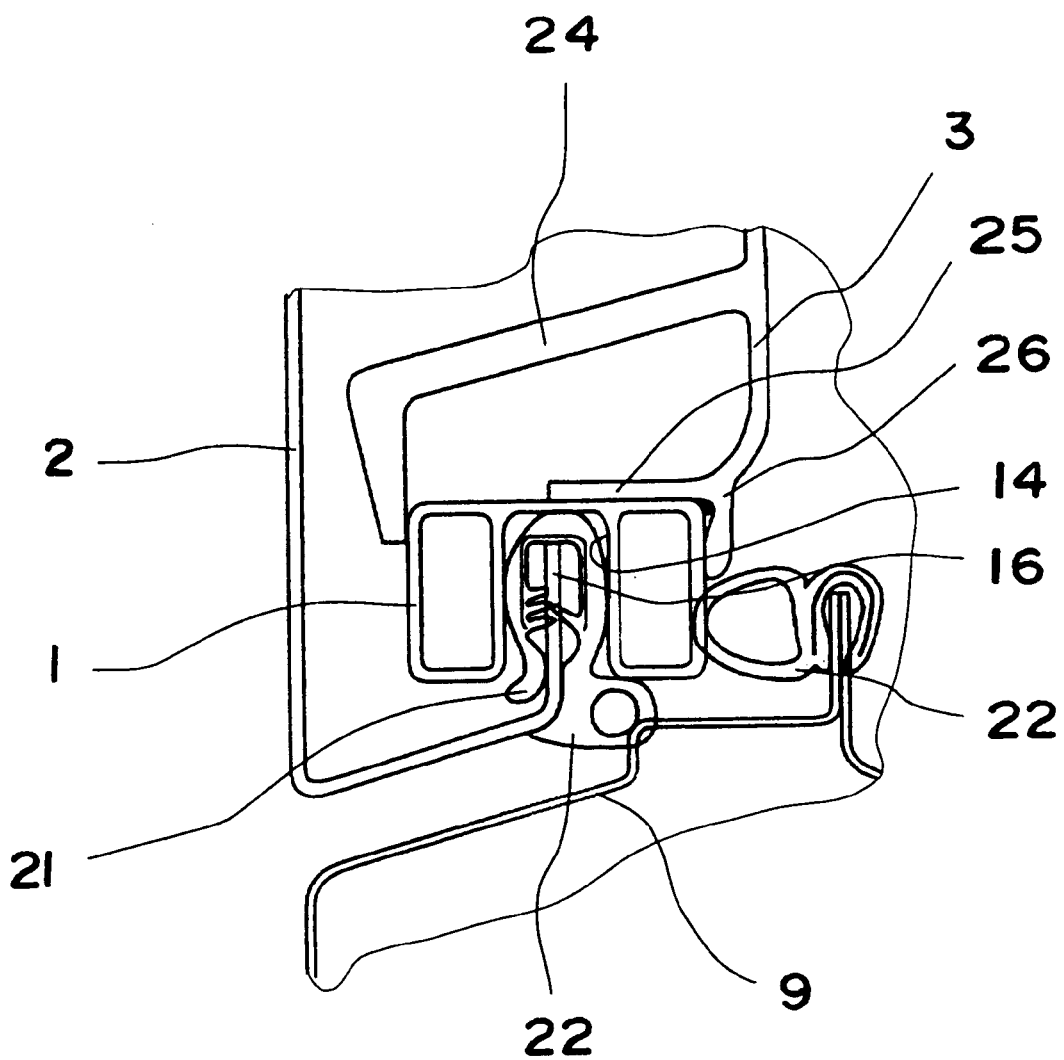

Furthermore, it is apparent from FIG. 4 that the door frame 1 also includes a retaining groove 14 on a third edge which runs roughly transversely to the two aforementioned first and second edges and includes a catch groove 15 (FIG. 5) on the fourth edge which is roughly opposite the retaining groove. The retaining groove 14 receives a corresponding retaining rail 16 provided on the third edge of the outside door panel 2. In a similar manner, the catch groove 15 receives a corresponding catch rail 17 provided on the fourth edge of the outside door panel 2.

For mounting purposes, the outside door panel 2 with the guide rails 12, 13 can be pushed within the guide grooves 10, 11 on the door frame 1 in their longitudinal direction until the retaining rail 16 enters the retaining groove 14 and the catch rail 17 engages the catch groove 15. Thus, with the present invention, the outside door panel 2 is mounted to the door frame 1 with this simple movement. Dismounting of the outside door panel 2, for example, during a repair, proceeds in exactly the reverse order of the installation.

It should be made clear that the mounting sequence for mounting the outside door panel 2 in accordance with the present invention can take place both horizontally and also vertically. In the present preferred embodiment shown, the outside door panel 2 may be mounted through a vertical slide-on motion of the outside door panel 2 with respect to the door frame 1, from the bottom of the door to top of the door.

Therefore, it should be clear in the embodiment shown in the drawings, that the first edge is the edge which is the front portion of the door in the installed position and the second edge is the vertically running edge of the door frame 1 and the outside door panel 2 which is the rear portion of the door in the installed position. Furthermore, it should also be clear that the third edge is the lower edge of the door and the fourth edge is the upper edge which lies in the area of the window shaft profile 5. Of course, the present invention may also be easily modified with edge designs such that the outside door panel 2 may be modified to be inserted by using a horizontal insertion movement.

The upper edge and the lower edge, which extend essentially transverse to the direction in which the outside door panel 2 slides relative to the door frame 1, may be shaped differently than the front edge and the rear edge which generally extend in an essentially straight line. More specifically, the upper edge and the lower edge can extend in an arc or a curve, as clearly illustrated in the rear edge of the outside door panel 2 in FIG. 1 which is provided as a wheel guard cutout.

It should be apparent that the present invention may be practiced such that the pairs of grooves and rails which are disclosed above can be interchanged in their assignment with respect to the door frame 1 and the outside door panel 2. In other words, the present invention may also be practiced by providing an outside door panel 2 with grooves instead of rails and providing a door frame 1 with rails instead of grooves. The features of the present invention can also be combined such that both the door frame 1 and the outside door panel 2 each include grooves and rails, each on a corresponding edge or any combination thereof, such that installtion of the type disclosed above is possible. And as discussed previously, it should also be evident in practicing the present invention that the retaining groove/retaining rail pair or the catch groove/catch rail pair can also be interchanged in their assignment to the bottom edge and the top edge or to the front edge and the rear edge when the outside door panel 2 is inserted horizontally.

Figure 6:
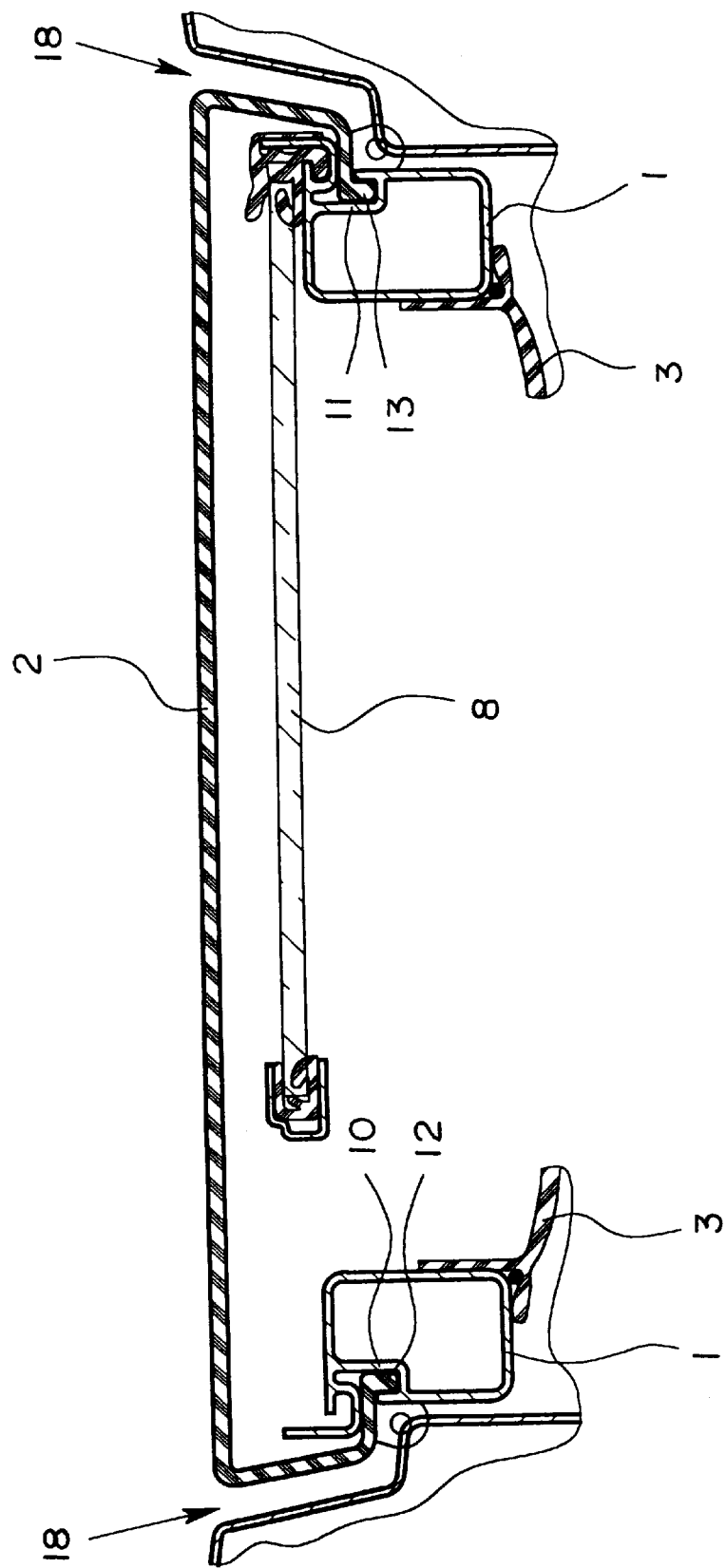
FIG. 6 shows a horizontal section through a preferred embodiment of a motor vehicle door in the door opening of a car body at low ambient temperature.
Figure 7:
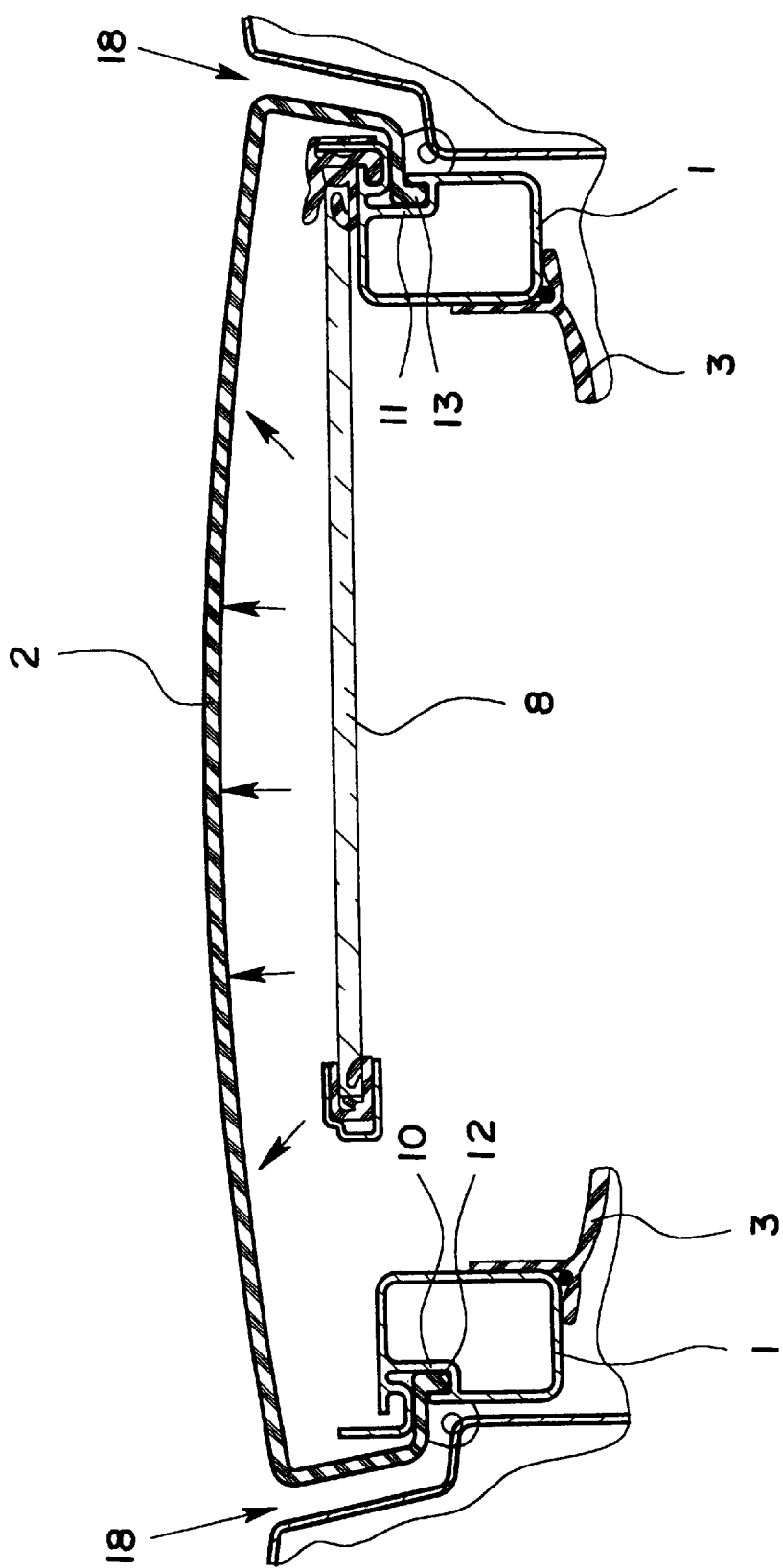
FIG. 7 is a horizontal section as illustrated in FIG. 6 at a higher ambient temperature.

FIGS. 6 and 7 clearly show a motor vehicle door in accordance with an embodiment of the present invention. As shown, there may be gaps 18 between the door and the door opening on the vehicle frame. By fixing the edges opposite one another by guide grooves 10, 11 and guide rails 12, 13, the outside door panel 2, which generally is made of plastic, does not yield laterally when the ambient temperature rises and the outside door panel 2 expands. FIG. 7 illustrates what actually occurs when the temperature rises. As indicated by the plurality of arrows, the convexity of the outside door panel 2 changes as a result of the expansion. Because the expansion results in slight bending of the outside door panel 2, the width of the gaps 18 decreases by a small amount. However, the dimensional changes in the gaps 18 are minimal and are in the range of less than 1 mm, which is substantially less than gap reductions experienced in the prior art designs.

This constancy of the gap dimensions is especially important on the essentially vertically extending edges of the motor vehicle door in the door cutout 9. In the area of the lower edge of the motor vehicle door, there need not be any gaps at all since the motor vehicle door can overlap the car body at this location. In addition, there need not be any gaps in the upper area of the outside door panel 2 at the ends of the window shaft profile 5 either since it would be visually important to have no gaps in this area. Accordingly, the vertical extension of the outside door panel 2 becomes especially important within the framework of the present invention.

Furthermore, although the embodiment discussed above includes continuous grooves and rails, the present invention may also be modified so that grooves and rails are provided only on partial sections of the available length if the door design so allows. This embodiment can be recommended especially for the molded plastic outside door panel 2. In the extruded profiles which generally comprise the door frame 1, this alternative embodiment of the present invention is less significant.

Absolute accuracy in the alignment of the guide grooves 10, 11 is not required. The embodiment of the present invention shown in the plane of the motor vehicle door exhibits guide grooves 10, 11 which are each "radially" open to the outside on the door frame 1 with the openings. This has an advantage in that the outside door panel 2 can be removed only when the motor vehicle door is opened thereby providing protection against theft. More specifically, this advantage is attained because the first, second and third edges, which preferably correspond to the front, rear and lower edges of the outside door panel 2, are bent in a substantially L-shape, or more preferably, are bent in a substantially U-shape thereby forming the guide rails 12, 13 and the retaining rails 16. Therefore, the formed bends and the corresponding guide grooves 10, 11 and retaining groove 14 are aligned to fit accordingly.

The change in the length of the inside door panel 3 when the temperatures changes, as exemplified by the arch shown in FIG. 7, can be reduced by the outside door panel 2 being made as a plastic molding of glass fiber reinforced plastic. With glass fiber reinforced plastic, the coefficient of thermal expansion differs relative to the direction of the fiber reinforcement and the fibers can be oriented to correspond to the installation position of the outside door panel 2.

By sliding on the outside door panel 2, it can be easily prestressed at low temperatures because the guide grooves 10, 11 and the guide rails 12, 13 are undercut and enable generation of a corresponding stress. This yields an especially torsionally-stiff construction of the motor vehicle door which minimizes noise development, increases the precision of fit of the door and relatedly, provides good sealing performance, thereby minimizing wind noise.

In addition, any metal cutting on the door frame 1 can be minimized in a motor vehicle door in accordance with the present invention. Furthermore, because the outside door panel 2 can be easily replaced, the serviceability of a motor vehicle door in accordance with the present invention is comparable to serviceability of other motor vehicle doors which are known from unpublished prior art.

Figure 5:
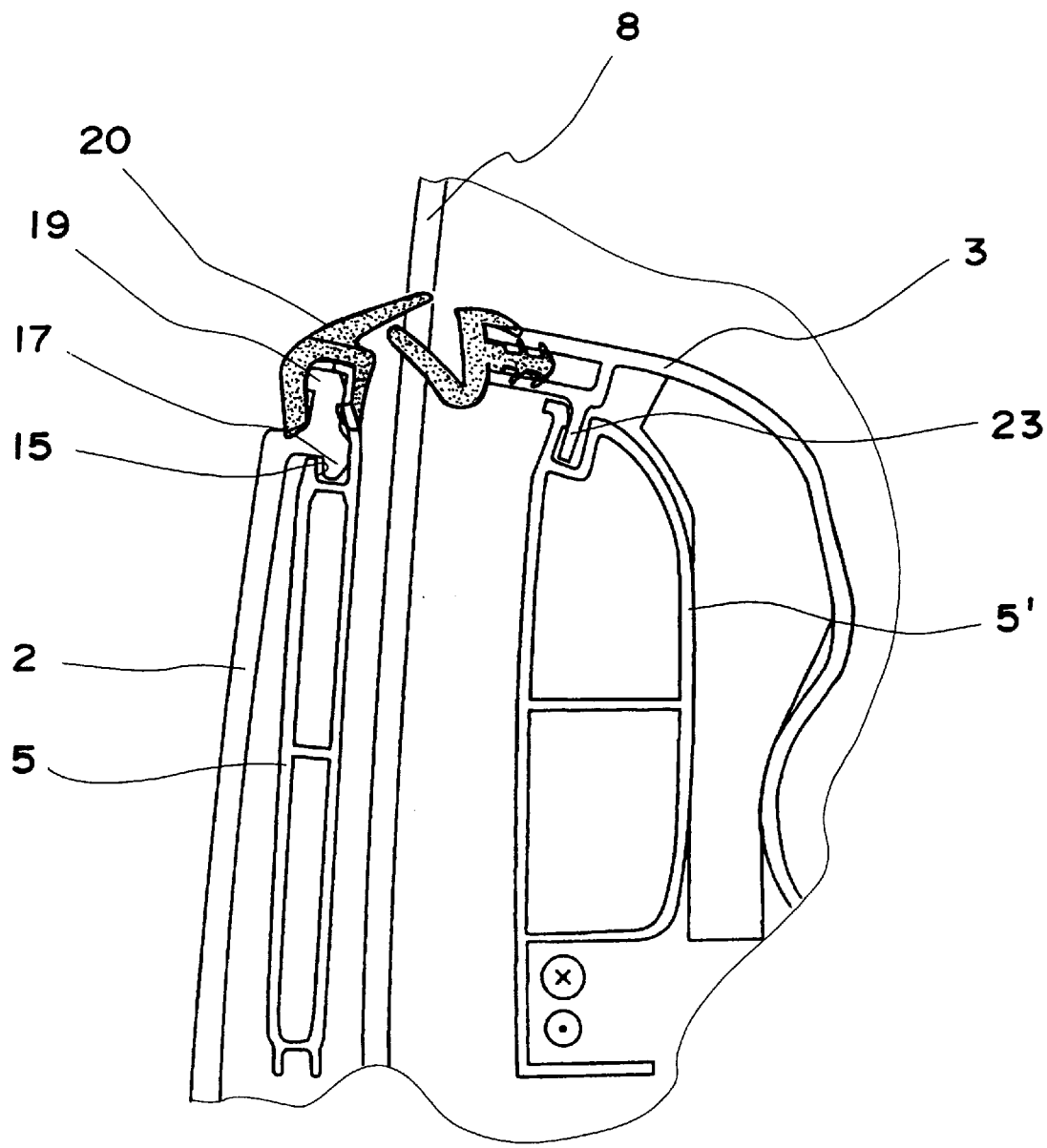

It must be also noted that, in the present embodiment, the outside door panel 2 includes a slip-on recess 19 on the upper edge for receiving a window shaft seal 20 as clearly illustrated in FIG. 5.

Furthermore, profile seals 21 are provided between the individual grooves and the rails which fit into the grooves. This is especially apparent in the retaining groove 14 on the lower edge of the door frame 1 as illustrated in FIG. 4. FIG. 4 also illustrates another embodiment where the profile seals 21 are integrally made of one-piece with the door-car body seal 22. These door/car body seals 22 are also illustrated in the various figures at positions where they are conventionally applied. The illustrated "floating" support of the outside door panel 2 provided by the profile seal 21 in the retaining groove 14 is also known from the above mentioned commonly-owned, unpublished prior application.

Figure 8:
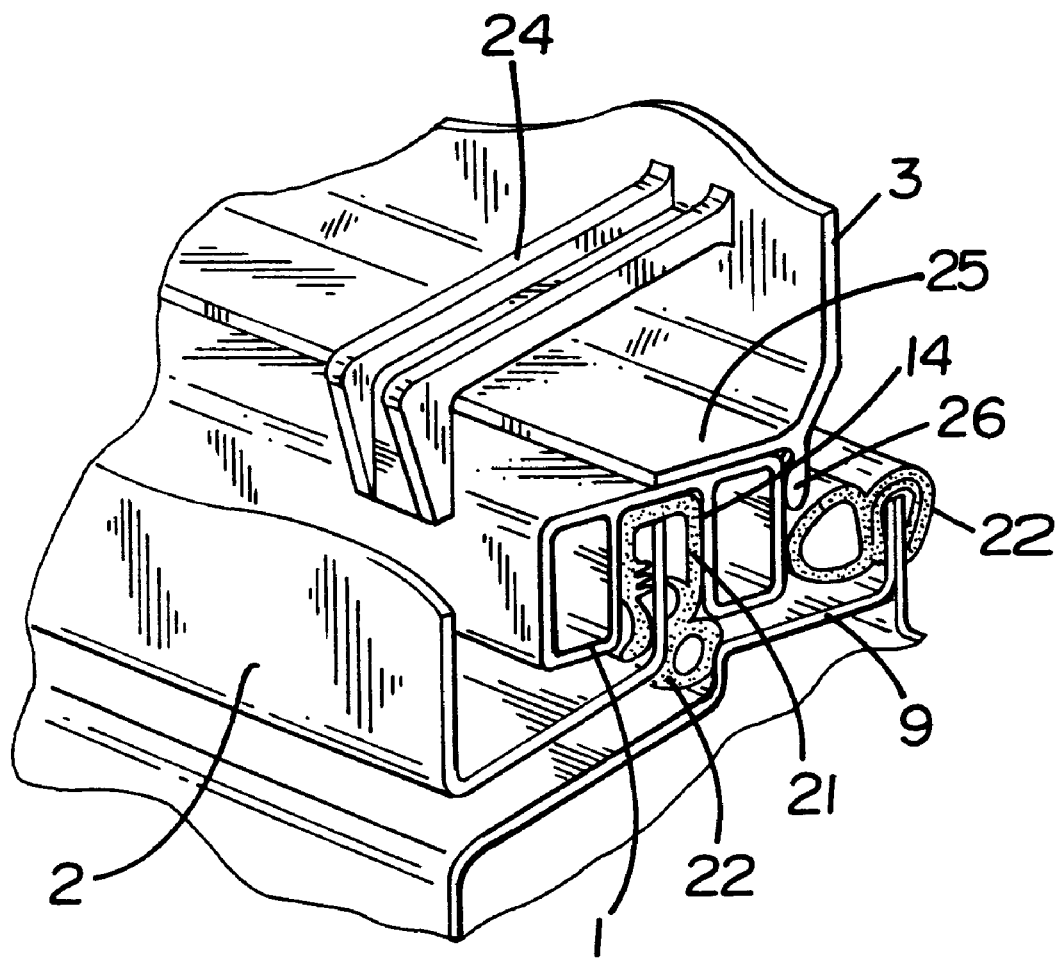
FIG. 8 is a perspective view of a section of a motor vehicle door in accordance with the present invention and a cutout of the motor vehicle body.

FIGS. 1 and 5, viewed in conjunction with FIG. 8 provides a better indication of how the inside door panel 3, which serves as an inside panel covering, is attached to the door frame 1. This corresponds to a system which, in this or a similar manner, is essentially considered the prior art. The inside door panel 3 is suspended at its upper edge in a suspension groove 23 provided on the door frame 1 and which opens towards the top of the door frame 1. The inside door panel's lower edge is hooked on the door frame 1 by means of catch hooks 24 as illustrated in FIG. 8. The peripheral edge 25 of the inside door panel 3 corresponds to an inside peripheral edge of the door frame 1 while the peripheral flange 26 resiliently adjoins the door frame 1.

For the sake of completeness, it is noted that the cross section illustrated in FIG. 2 also includes a hinged joint 27 which is screwed onto the door frame 1 and establishes the connection of the motor vehicle door to the motor vehicle body on the door cutout 9.

We claim:

1. Motor vehicle door comprising a door frame defining a door opening and an outside door panel detachably mounted on said door frame at said door opening;
    wherein said door frame comprises an undercut guide groove, formed of an internal recess with an outer side overhang, on a first edge of the door frame and on a second edge of the door frame which is substantially opposite said first edge, retaining groove on a third edge of the door frame which extends substantially transversely to said first edge and to said second edge, and a catch groove on a fourth edge of the door frame which is substantially opposite said third edge;
    wherein said outside door panel comprises a guide rail on a first edge of the door panel and on a second edge of door panel, a retaining rail on a third edge, and a catch rail on a fourth edge, said guide rails being receivable by said undercut guide grooves, said retaining rail being receivable by said retaining groove and said catch rail being receivable by said catch groove;
    wherein said guide rails are displaceable into said guide grooves in a longitudinal direction of the guide grooves until said retaining rail enters said retaining groove and said catch rail engages said catch groove in a manner that fixedly attaches said outside door panel to said door frame.

2. Motor vehicle door as claimed in claim 1, wherein said first edges are substantially vertically extending edges and are front edges in an installed position in which said door panel is attached to said door frame, said second edges are also substantially vertically extending edges and are rear edges in said installed position, said third edges are bottom edges in said installed position, and said fourth edges are outside edges which are upper edges in the installation position.

3. Motor vehicle door as claimed in claim 1, wherein the undercut guide grooves have an L-shaped cross section.

4. Motor vehicle door as claimed in claim 1, wherein the undercut guide grooves have an L-shaped cross section.

5. Motor vehicle door as claimed in claim 1, wherein the outside door panel is bent on the first, second and third edges thereof to form the guide rails and the retaining rail.

6. Motor vehicle door as claimed in claim 1, wherein the door frame is made of metal sections.

7. Motor vehicle door as claimed in claim 6, wherein the outside door panel is made of a molded plastic part.

8. Motor vehicle door as claimed in claim 7, wherein metal sections are made of aluminum and said plastic part is made of a glass-fiber reinforced plastic.

9. Motor vehicle door as claimed in claim 1, wherein the outside door panel has a slip-on recess for a window shaft seal on the top edge thereof.

10. Motor vehicle door as claimed in claim 1, wherein the outside door panel has a slip-on recess for a window shaft seal on the top edge thereof.

11. Motor vehicle door as claimed in claim 10, wherein a profile seal is provided between at least one of the retaining groove and the retaining rail which fits therein, the catch groove and the catch rail which fits therein, and the guide grooves and the guide rail which fits therein.

12. Motor vehicle door as claimed in claim 1, wherein profile seals are provided between the guide groove and the guide rails which fit into them.

13. Motor vehicle door as claimed in claim 12, wherein the profile seal is made of one piece with a door/body seal.

14. Motor vehicle door as claimed in claim 1, wherein the inside door panel is suspended on an upper edge thereof in a suspension groove that is upwardly open on the door frame and the lower edge is hooked on the door frame by means of catch hooks.

* * * * *